United States Patent [19]

Kocsanyi et al.

[11] 4,082,367
[45] Apr. 4, 1978

[54] CONTINUOUSLY CHARGED PIPE-CHAMBER FEEDER PROVIDED WITH DIVIDED OR INTERMEDIATE CHAMBER FOR HYDRAULIC MATERIAL HANDLING

[75] Inventors: László Kocsanyi, Budapest; Lajos Varga, Eger, both of Hungary

[73] Assignee: Heves Megyer Tanácsi Epitöipare Vállalat, Eger, Hungary

[21] Appl. No.: 658,461

[22] Filed: Feb. 17, 1976

[30] Foreign Application Priority Data

Feb. 18, 1976 Hungary ........................................ 680

[51] Int. Cl.² ............................................. B65G 53/30
[52] U.S. Cl. ...................................................... 302/14
[58] Field of Search ................................... 302/14, 66

[56] References Cited

U.S. PATENT DOCUMENTS

| 3,140,123 | 7/1964 | Bowen | 302/14 |
| 3,351,389 | 11/1967 | Schneider | 302/14 |
| 3,449,013 | 6/1969 | Sakamoto et al. | 302/14 |
| 3,560,053 | 2/1971 | Ortloff | 302/14 |

*Primary Examiner*—Evon C. Blunk
*Assistant Examiner*—James L. Rowland
*Attorney, Agent, or Firm*—Ernest F. Marmorek

[57] ABSTRACT

The equipment according to the present invention renders possible the continuous charge and similarly, continuous discharge in the case of two-chamber feeders considerably shorter than the original chambers, respectively, and by their operation according to a cyclic order deviating from the usual one. More precisely, the set aim is achieved according to the invention in such a way that to the pipe chambers, intermediate chambers are connected which can be connected to the pipe chamber or to the clear water basin, or to one of the two pumps (charging pump and high-pressure pump) by means of corresponding locking means. Thereby, it may be achieved that the intermediate chamber can receive the charging current arriving during the changeover loss time and thus, the delivery output of the feeder of identical dimensions and operating under identical flow conditions, will increase, the dilution of the slurry stops and the two-chamber feeder will be suitable for being used as a direct pressure intensifier of the continuously arriving slurry.

2 Claims, 7 Drawing Figures

CONTINUOUSLY CHARGED PIPE-CHAMBER FEEDER PROVIDED WITH DIVIDED OR INTERMEDIATE CHAMBER FOR HYDRAULIC MATERIAL HANDLING

FIELD OF THE INVENTION

The present invention relates to a pipe-chamber feeder for hydraulic material handling.

BACKGROUND OF THE INVENTION

In case of hydraulic delivery, with the pipe-chamber feeders used for increasing the pressure of the slurry, two or more chambers of similar size and construction are usually operated periodically according to a predetermined rhythm. The operational cycle of one chamber comprises the filling-up of the chamber with low-pressure slurry, then the sluicing to a considerably higher delivery pressure, washing-out of the content of the chamber into delivery duct by means of a high-pressure water jet, and the release of pressure necessary thereafter. The cycle consisting of the above four steps is repeated continuously within one chamber and the time diagram of cycles of the individual chambers is identical. The high-pressure water jet is used as a recycled delivery medium, since the slurry, having a relatively high degree of viscosity, cannot be delivered under high pressure, while water, being used as the recycled delivery medium, can be transported at high pressure.

The basic requirement of the operation of such a known feeder is the continuous flow of the high-pressure slurry in the delivery duct and that the rhythmic operation of the locking mechanisms of the feeder should not cause any appreciable speed or pressure fluctuation. Therefore, in a two-chamber feeder the discharging cycle occupies necessarily one half of the cyclic time. Since the sluicing of pressure occurs in the closed state of the chamber and during this time the chamber cannot be charged, or refilled with fresh slurry, it is obvious that a shorter time is available for charging or refilling of the chamber with slurry, than for discharging it; therefore the filling-up of the two-chamber feeders cannot be continuous.

The detrimental effect of the stagewise filling-up is due to the delivery capacity being reduced, on one hand, and due to the slurry being diluted in the feeder, on the other hand, since in the intervals of the filling-up water is required to be supplied to the delivery duct in order to maintain the flow, a more serious drawback is caused by the intermittent filling up in such cases when the feeder is used as pressure intensifier in a series-connected chain. In this case the low-pressure slurry arrives with a continuous flow; it can be fed, however, only intermittently into the pressure intensifier, and consequently the insertion of a storage tank becomes necessary.

The continuous filling-up is possible with the feeders of conventional construction only when using more than two, or at least three chambers, requiring considerable space and large expenses, due to the chamber lengths being practically several hundred meters.

SUMMARY OF THE INVENTION

It is, therefore, an object of the present invention to provide an improved pipe-chamber feeder for hydraulic material handling which eliminates the above-described shortcomings of known devices of similar nature.

The equipment according to the present invention renders possible a continuous charge and similarly a continuous discharge in the case of two-chamber feeders by the use of divided chambers and of an intermediate chamber considerably shorter than the original chambers, respectively, and an operation according to a cyclic order deviating from a conventional cycle. More precisely, the desired object is achieved according to the invention, in such a way that to the pipe chambers, intermediate chambers are connected each of which can be connected to one of the pipe chambers or to a clear water basin, or to one of two pumps, a charging pump and a high-pressure pump, by means of corresponding locking means. Thereby, the respective intermediate chamber can receive the charging slurry flow arriving during the pipe chamber changeover time and thus, the delivery output of the feeder of identical dimension and operating under identical flow conditions will increase, the dilution of the slurry with water will be reduced, and the two-chamber feeder will be suitable for being used as direct pressure intensifier of the continuously arriving slurry.

BRIEF DESCRIPTION OF THE DRAWINGS

The invention will become more readily apparent from the following description of preferred embodiments thereof shown, by way of example, in the accompanying drawings, in which:

FIG. 1 indicates the feeder using slurry discharge in the same direction as that of the slurry feed, whereas FIG. 2 displays the feeder working with rinsing in an opposite direction as compared to the supply direction.

DESCRIPTION OF THE PREFERRED EMBODIMENTS

Figure 1:
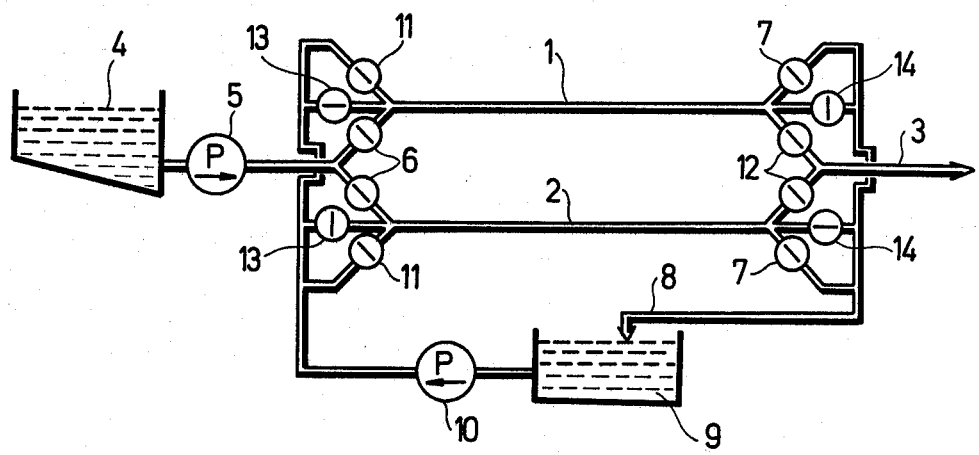
FIGS. 1 and 2 show the schemes of the two main types of the known feeders of conventional construction built up of two pipe chambers.
Figure 2:
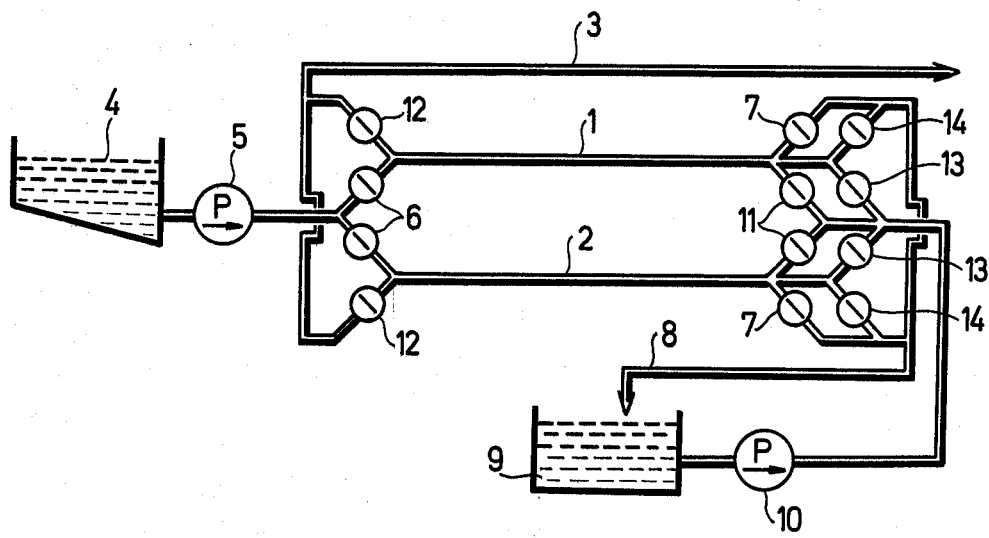

The schemes shown in FIGS. 1 and 2 of feeders of conventional construction, built up of two pipe chambers are commonly characterized by the pipe chambers 1 and 2 being pipe sections made from a pipe having a diameter identical with that of the delivery duct 3, provided at both ends with two locking mechanisms, that is a total of four, locking mechanisms, their length being much larger than their diameter, a length of practically several hundred meters being feasible, the pipes being generally disposed horizontally and for the purpose described usually having a U-shape, although being shown in the drawing as straight sections.

The low-pressure slurry is delivered from an open basin 4 by the charging pump 5 into the chamber to be filled through one of the main locking mechanisms 6.

The charging of the chambers is carried out in a time alternating manner, and, only one of the main locking mechanisms 6 can be open. From the chamber to be charged the clear water remaining after the previous discharge is forcefully flushed out by the slurry stream filling-up through the main locking mechanism 7 of the chamber through the water outlet 8 into the clear water basin 9.

In the meantime, from the chamber to be discharged the previously accumulated slurry is forcefully flushed out by the clear water jet stream, acting as a recycled delivery medium, entering through the main locking mechanism 11 of the chamber, into the high-pressure delivery duct 3 through the main locking mechanism 12 of the chamber. A critical and essential requirement of the pressure intensifying process of the feeder is that in the delivery duct 3 the flow of the high-pressure slurry must be continuous, without there occurring any appreciable speed and/or pressure fluctuation.

Therefore, when switching over after having finished the above described processes, that is from the filling-up of one chamber and the discharge of the other chamber, first the main locking mechanisms 6 and 7 of the filled up chamber are closed and the slurry supply stream is thus broken, then the auxiliary locking mechanism 13 of the same chamber, being considerably smaller than the main locking mechanism, is opened, interconnecting that chamber with the pressure duct of the high-pressure pump 10, through which the delivery pressure of the chamber is increased at a predetermined rate preventing a sudden pressure variation at the delivery pump. The filled up or first chamber having achieved the delivery pressure, the main locking mechanism 11 and then the discharge locking medium 12 of the first chamber are opened, whereas the discharge locking mechanism 12 of the second chamber is closed simultaneously and synchronized with the opening of the first chamber. Thus the high-pressure water jet which had previously been flowing through the first chamber already discharged into the delivery duct begins now to press the slurry to be found in the filled up or second chamber therefrom into that delivery duct.

The main locking mechanism 11 of the diischarged chamber being closed, the auxiliary locking mechanism 14 thereof, interconnecting that chamber with the water inlet pipe 8 for the clear water basin 9 is now opened, and in this way, by reopening the mechanisms 6 and 7 of the first chamber and it being freed of pressure through the small auxiliary mechanism the filling up of that chamber is started again. The slurry supply stream, having been broken at the beginning of the changeover process, has thus been temporarily stopped.

The mechanisms discussed above are usually characteristic for the main types of such mechanisms, according to FIGS. 1 and 2. The difference between them is that the slurry supply stream entering through the main locking mechanism 6 and the discharging slurry stream entering through the mechanism 11 are connected to the same end of the alternating chamber in the main type according to FIG. 1, and to opposite ends, in the main type according to FIG. 2, as the arrangement of the mechanisms 6 and 11 shows. This results in that in the main type, according to FIG. 1, the directions of the charging and discharging flow in the chamber are identical, whereas in the main type, according to FIG. 2, they are opposite.

Figure 3:
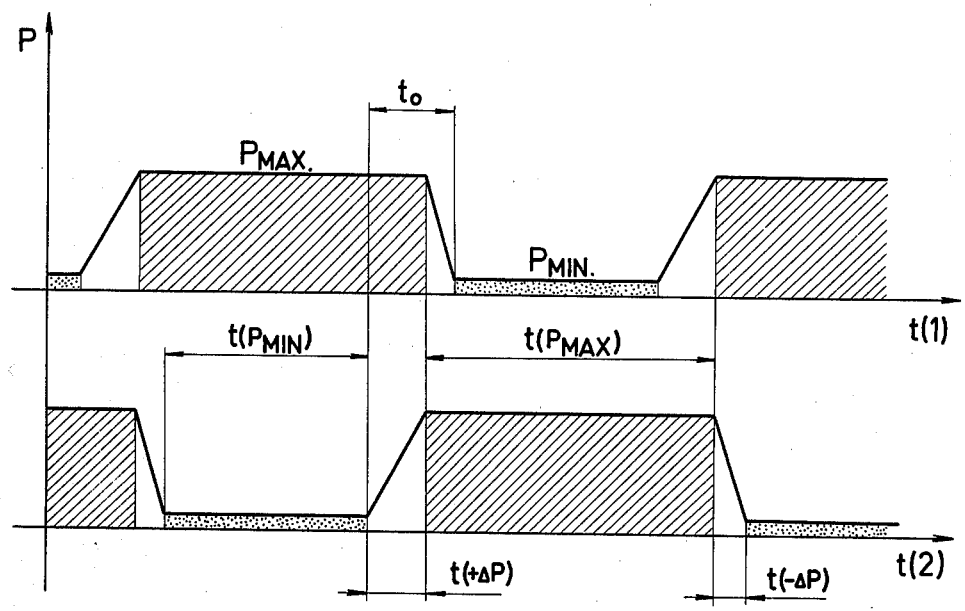
FIG. 3 indicates the known operation commonly characterizing them, where the pressures in the individual chambers are given as a function of the time.

FIg. 3 shows the flow diagrams indicating the pressure in chamber 1 on the abscissa $t(1)$ and the pressure in chamber 2 on the abscissa $t(2)$ as a function of the time. It may be seen that the $t(P\ max)$ duration of the discharging cycle taking place at a P max pressure takes about one half of the cycle time, whereas the $t(P\ min)$ duration of the charging taking place at a P min pressure, which duration is necessarily shorter than the former pressure duration, namely at least by the sum of the $t(+\Delta P)$ time required for putting under pressure the filled up chamber and of the $t(-\Delta P)$ time required for releasing the pressure from the discharged chamber, the former operation generally requiring a longer time than the latter one. The supply operations are indicated by cross hatching in FIG. 3 thus FIG. 3 clearly illustrates the discontinuity of the charging.

Although the supply and discharging conditions of the chambers used with the equipment would render possible the continuous filling up even in case of delivery of lumpy material, due to the operations in connection with the changeover, and mainly due to the pressure sluicing, however, this cannot be attained with the conventional two-chamber feeders, on the basis already discussed.

For that matter, although in FIG. 3 the times necessary for the actuation of these locking mechanisms are not separately indicated, this does not mean, however, that an instantaneous actuation of the locking mechanisms would be assumed, only that this is calculated at the time of the pressure sluicing.

The supply time loss occurring in the known two-chamber feeders, or the changeover time is not negligible in the practice and may require even 20 – 25% of the cycle time, which results in a reduction in a nearly equal ratio of the delivery capacity and in the dilution of the slurry with the recycled delivery medium, namely water.

The above time loss renders the known two-chamber feeders unsuitable for being used as direct charge mechanism in a multi-station system.

Figure 4:
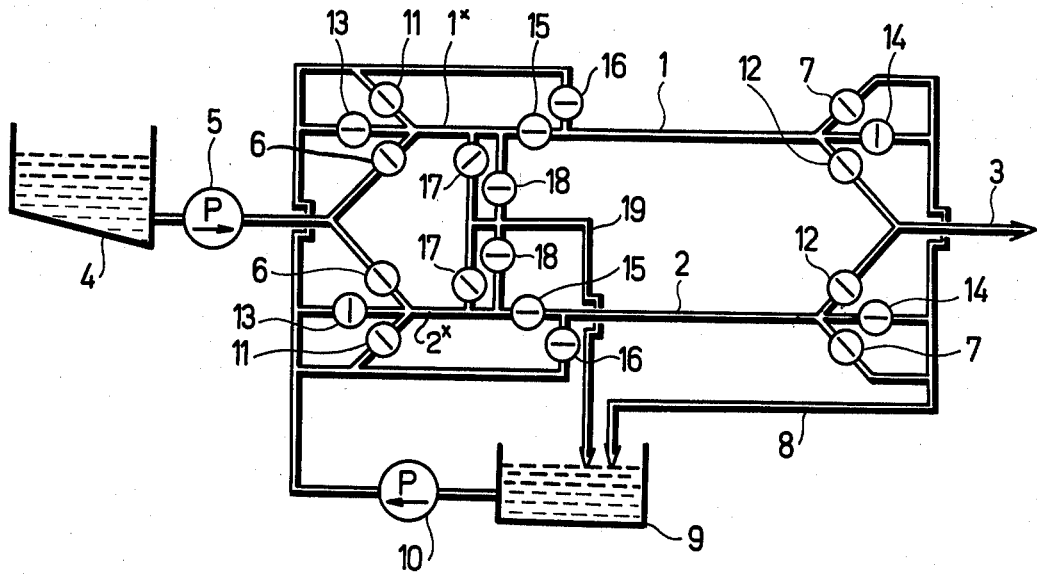
FIG. 4 shows the scheme of the feeder having divided pipe chambers according to the invention, providing for the continuous filling up in case of a supply and discharge in an identical direction, applying the process similarly according to the invention, shown in FIG. 5.

The feeder built up of two divided pipe chambers, according to the invention, and shown in FIG. 4, discharges in a direction identical with that of the supply similarly to the conventional main type according to FIG. 1, that is the mechanisms 6 and 11 of the chambers are connected to the same end. The modification rendering possible the continuous supply consists in the pipe chambers being divided in two by locking mechanisms 15, forming thus effective pipe chambers 1 and 2, and intermediate sections $1^x$ and $2^x$. The intermediate sections are shorter compared to the pipe chambers forming the main sections, their length being established by taking into consideration the changeover time loss so that they can receive the slurry supply stream arriving during this time.

The intermediate sections $1^x$ and $2^x$ are connected through the mechanisms 6, on one hand, and 11 and 13 on the other hand, to the open basin 4 and to the duct of the pump 10 respectively in the same manner as in the known fashion according to FIG. 1, but in addition, the pipe chambers 1 and 2 themselves may communicate each with the pump 10 through respective mechanisms 16. The two intermediate sections $1^x$ and $2^x$ are provided also with anciliary mechanisms 17 and 18, respectively, which communicate with the clear water basin 9 through a common duct 19. The auxiliary mechanism 17 has a smaller by-pass opening than the main locking mechanism 18, and serves only for the reduction of pressure.

The use of divided pipe chambers utilizes the fact that in the case of a discharge from the pipe chambers in a direction identical with that of the charge of those pipe chambers only that part of the chamber discharges first, through which the slurry stream has first passed. Therefore, if section $1^x$, or $2^x$, respectively, of the chamber calculated from the entering of the slurry stream, and which at that time is capable of receiving the slurry stream arriving during the idle time normally reserved for pipe chambers changeover, can be separated from the same pipe chamber by the insertion of a respective locking mechanism 15, then a further mechanism 16 can provide for the high-pressure rinsing water to enter the effective or operative pipe chamber, while by-passing the intermediate sections. Thus, at the moment after the discharge of fluid from the sections $1^x$, and $2^x$, respectively, the sections $1^x$, and $2^x$, respectively, are disconnected from the respective pipe chamber by closing the mechanisms 15 and 11 and by simultaneously opening the respective mechanism 16, while the discharge of the respective pipe chamber through the locking mechanism 16 is continued in a trouble-free manner. The release of pressure from the disconnected section $1^x$ or $2^x$ is carried out by closing the auxiliary mechanism 13, and by opening the auxiliary mechanism 17.

In this way the intermediate section of the discharged chamber is available in a pressure free state at the end of the charging of the other chamber. Now, while closing the mechanisms 6 and 7 of the charged chamber, the mechanisms 6 and 18 of the intermediate section in question being simultaneously opened, the supply current can continue without any interruption to the intermediate section, from which the water flows out through the duct 19. Simultaneously with this process the putting under pressure of the charged chamber, the changeover of the discharging current to that chamber, and, the decrease of pressure from the intermediate section being just filled will start. Then, by closing the mechanisms 18 and 17 and simultaneously opening the mechanisms 15 and 7, the intermediate chamber portion is connected again to the main chamber and the charging is continued until it is fully filled up, thereafter by closing the mechanisms 6 and 7, the charging current is continued to the pressure-freed intermediate section disconnected in the meantime from the discharge operation of the other chamber. The filled up chamber is now put under pressure by opening the auxiliary mechanism 13, and then the discharge is started by opening the mechanisms 11 and 12.

Figure 5:
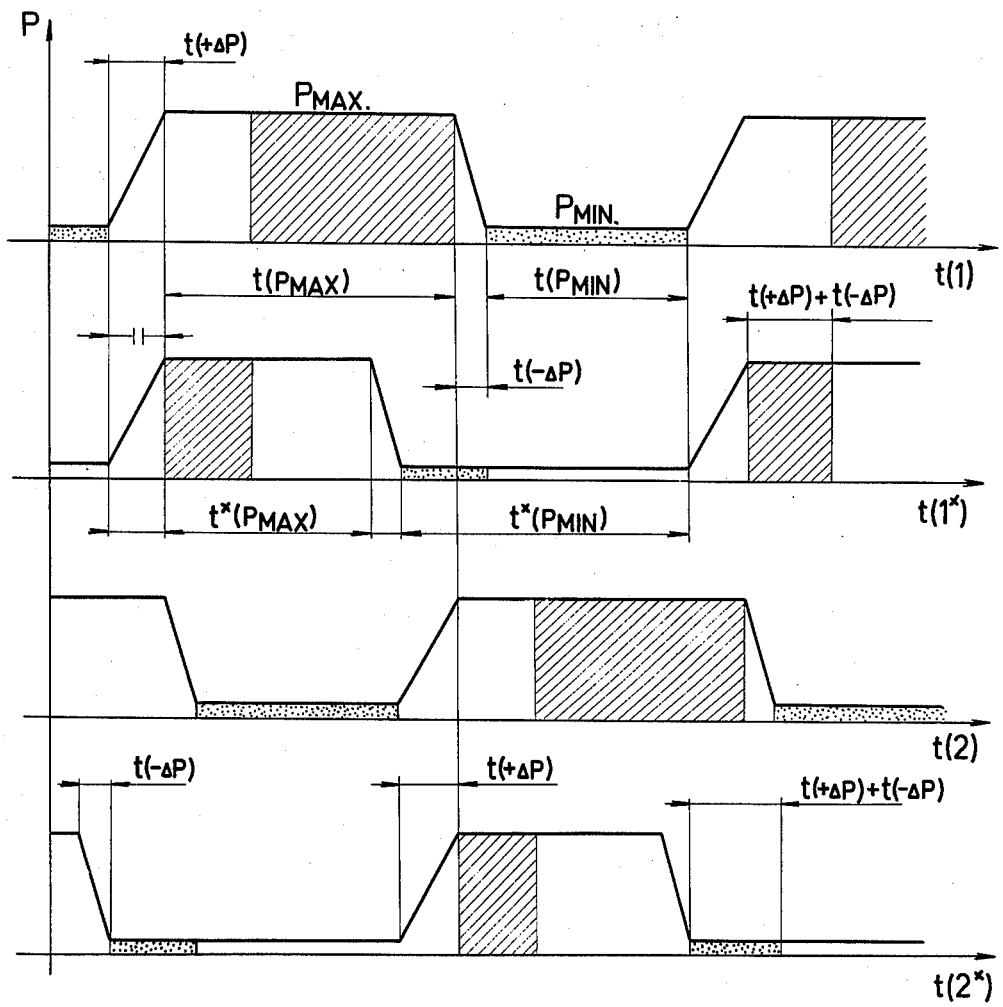

In FIG. 5 the working process is indicated as being divided into intervals associated with the divided chambers. The four curves of the diagram jointly show that both the charging stream and the discharging stream are continuous. Just like in FIG. 3, the supply is indicated here, too, by cross hatching and it can be clearly seen in the figure that there is no instant when feeding of the slurry is discontinued in any of the four diagrams as would be indicated by the absence of any cross hatching.

Two sections of the divided chambers operate in one portion of the working process jointly in the other part, however, they operate separately, thus making possible a continuous slurry supply. The time of joining the two chamber portions is unambiguously determined at the instant when the intermediate section becomes full, whereas the time of separation is chosen after the discharge of the intermediate section, so that pressure relief of the intermediate section can occur no later than at the moment when the other chamber becomes full. The moment of separation of the two chamber portions determines the end point of the $t^x$(P max) period and the beginning of the $t^x$(P min) period. In FIG. 5 the latest moment of the separation is shown, according to what has been discussed above, the $t^x$(P max) can become shorter up to that limit, and correspondingly the $t^x$(P min) period can be increased.

Figure 6:
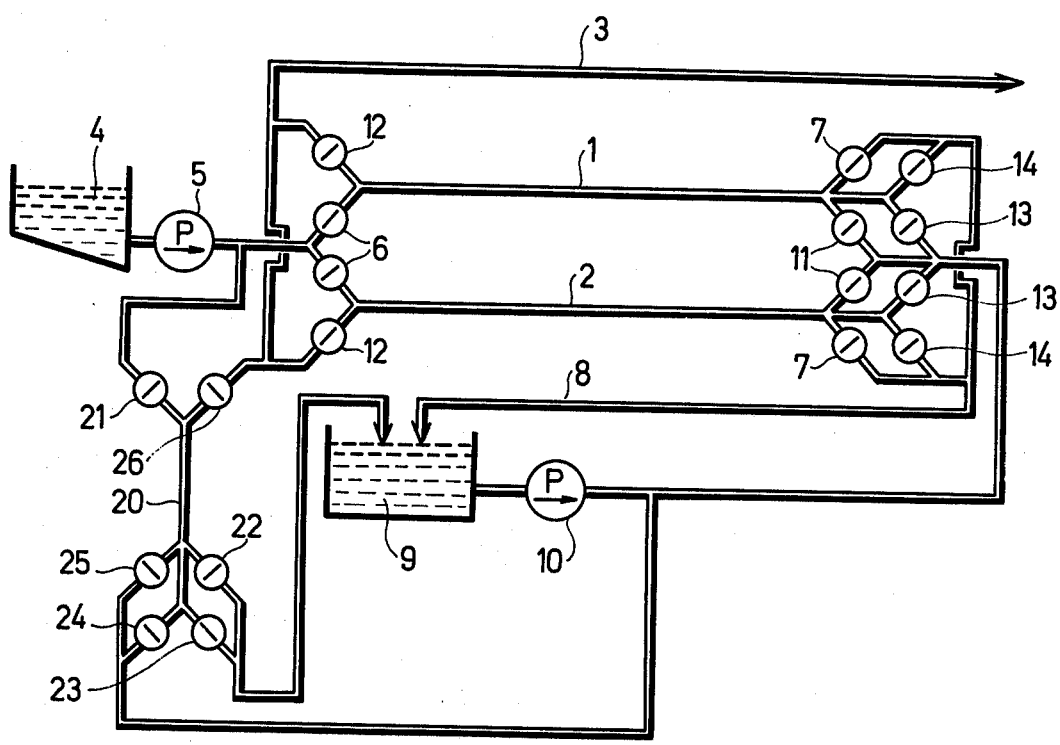
FIG. 6 represents the scheme of the equipment according to the invention, provided with an intermediate chamber, which carries out the continuous filling up in the case of a supply and discharge in opposite directions, whereas FIG. 7 indicates the operation thereof according to the invention.

The feeder consisting of two chambers and of an intermediate chamber shown in FIG. 6 accomplishes the continuous filling up in the case when the supply and discharge of the chambers of the feeder occur from opposite directions as in the conventional and solution according to FIG. 2. In this case a divided chamber cannot be used, since the chamber section where the slurry supply enters will be discharged only in the final phase of the discharge, so that a preliminary separation and release of pressure will not be possible.

The two pipe chambers 1 and 2, according to FIG. 6, are connected to an intermediate chamber 20 which communicates with one end thereof with the supply pump 5 through the mechanism 21, with the delivery duct 3 through the locking mechanism 26, and communicates with the other end with the clear water basin 9, or with the pressure side of the pump 10 through the mechanisms, and locking means 22–25, respectively.

The principle of operation of the two-chamber feeder deviates from the cyclic order of operation of conventional feeders in two essential points:

a. The intermediate chamber 20 carries out twice as many cycles of operation as one pipe chamber each, since it receives all of the slurry supply occurring on, or during each changeover time.

b. The discharge of the intermediate chamber 20 is incorporated into the discharge cycle of the pipe chambers in such a way that the discharge of the chamber is interrupted for this time and the discharging current is deflected into the intermediate chamber.

At the filling-up of either chamber the intermediate chamber is in discharged and pressure-released state. Simultaneously with the locking of the mechanisms 6 and 7 of the charged chamber the slurry supply is fed to the intermediate chamber 20 by opening the mechanisms 21 and 22. The length of the intermediate chamber 20 renders possible the acceptance of the slurry supply during the changeover time. The chambers are then switched over, the mechanisms 6 and 7 of the discharged and the pressure-released chamber are opened, and simultaneously the locking mechanisms 21 and 22 and auxiliary locking means 23 of the intermediate chamber 20 are locked. Thereafter the intermediate chamber 20 is put under pressure by opening the auxiliary locking means 24, then the locking means 25 and 26 are opened, and simultaneously the mechanism 12 of the chamber to be discharged is locked.

Thereby the discharge of the chamber to be discharged is interrupted, and the intermediate chamber 20 is connected to the delivery duct 3. Since in the chamber in which the discharge was interrupted, the effective pressure continues to be maintained after the discharge of the intermediate chamber simultaneously with the locking of the mechanisms 24, 25 and 26 the corresponding mechanism 12 being opened again, the discharge of that chamber is continued. The discharged intermediate chamber 20, however, being relieved of pressure by opening of the auxiliary mechanism 23, is ready again to be filled up during the next changeover period.

Figure 7:
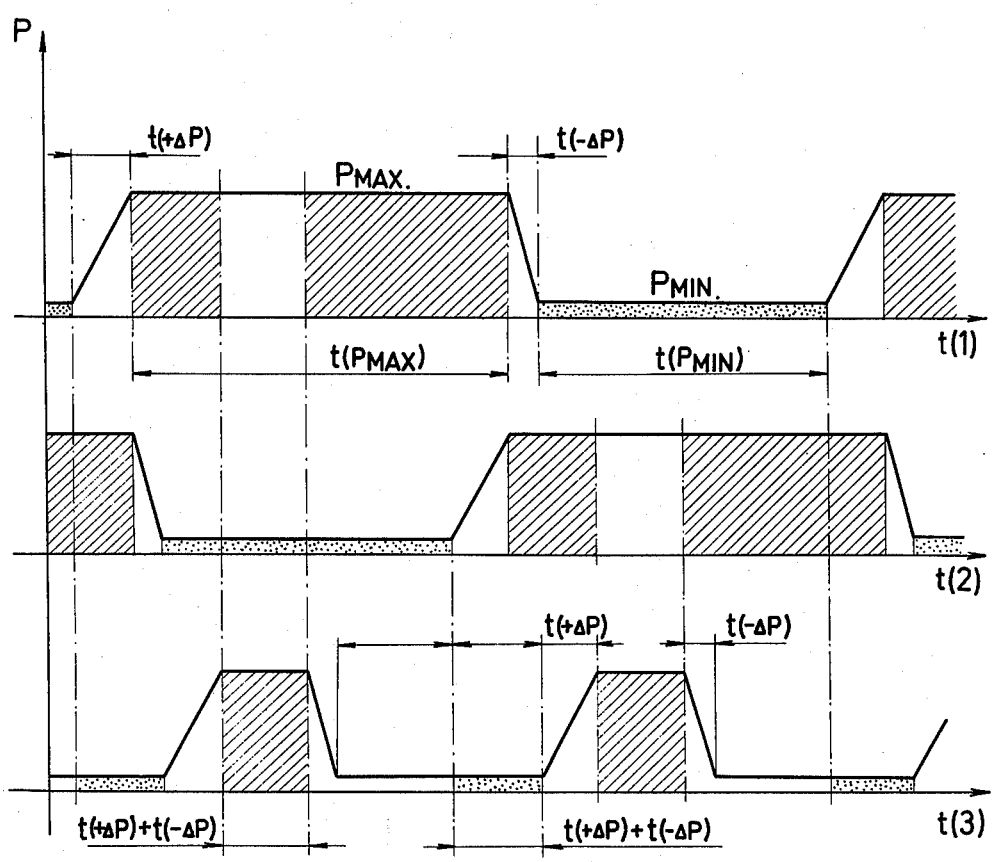

In FIG. 7 it will be seen that both the slurry supply and discharge are continuous. The interruption of the discharge of the pipe chamber due to the discharge of the intermediate chamber 20 is included in the $t$(P max) time at (P max) delivery pressure of the chambers, the duration of which is one half of the cyclic time; this time is, however, a fully useful delivery time due to the incorporation of the intermediate chamber 20. It is also obvious that the intermediate chamber 20 carries out twice as many working cycles as the pipe chambers.

We wish it to be understood that we do not desire to be limited to the exact details of constructions shown and described, for obvious modifications will occur to a person skilled in the art.

What we claim is:

1. A pipe-chamber feeder apparatus for handling of a liquid, comprising in combination:
    two pipe chambers having respective first and second ends,
    a delivery duct selectively connectable to the first ends of said chambers,
    a liquid supply pump selectively connectable to one of said chambers for supplying the liquid thereto,
    a relatively high pressure pump selectively connectable to the other of said chambers for transporting a recyclable delivery medium through one of said pipe chambers,
    a basin for said medium selectively connectable to the ends of said chambers,
    two intermediate chambers, each of said intermediate chambers including a section adapted to be selectively locked, and selectively connectable with one end thereof to a corresponding one of said pipe chambers, and
    locking means for selectively connecting the ends of said intermediate chambers connectable to said pipe chambers to said basin, the other ends of said intermediate chamber being selectively connectable to one of said pumps,
    whereby, upon a corresponding one of said sections being locked from a corresponding one of said pipe chambers, and upon said locking means being open to provide for the delivery medium to flow therethrough with the periodic assistance of said high pressure pump to alternately force the liquid through said pipe chambers, respectively, the liquid is supplied continuously through said supply pump to said pipe chambers in an alternate manner, and continuously discharged substantially free from pressure fluctuation through said delivery duct.

2. A pipe-chamber feeder apparatus for handling of a liquid, comprising in combination:
    two pipe chambers having respective first and second ends,
    a delivery duct member selectively connectable to the first ends of said pipe chambers,
    a liquid supply pump member selectively connectable to one of said pipe chambers for supplying the liquid thereto,
    a relatively high pressure pump selectively connectable to the second ends of said pipe chambers for transporting a recyclable delivery medium through one of said pipe chambers,
    a basin for said medium selectively connectable to the ends of said chambers,
    an intermediate chamber having third and fourth ends, said third end of said intermediate chamber being selectively connectable to one of said members, said fourth end of said intermediate chamber being selectively connectable to said basin and said high pressure pump,
    whereby, upon the discharge of said chambers being interrupted at alternate intervals by being disconnected from said liquid supply pump and said delivery duct, said intermediate chamber is connected to said supply pump and to said basin to discharge the liquid through said delivery duct with the assistance of said high pressure pump during the intervals the liquid discharge through said delivery duct has been disconnected from either of said chambers, so that the liquid is continuously supplied through said supply pump to one of said chambers, and continuously discharged, substantially free from pressure fluctuation, through said delivery duct.

* * * * *